(12) United States Patent  (10) Patent No.: US 9,355,677 B2
Lammers et al.  (45) Date of Patent: May 31, 2016

(54) PREAMPLIFIER FOR ADJUSTABLE WRITE CURRENT

(71) Applicant: Seagate Technology LLC, Cupertino, CA (US)

(72) Inventors: Todd Michael Lammers, Lafayette, CO (US); Housan Dakroub, Dearborn Heights, MI (US); Jason C. Jury, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/168,970

(22) Filed: Jan. 30, 2014

(65) Prior Publication Data

US 2015/0213813 A1 Jul. 30, 2015

(51) Int. Cl.
*G11B 20/10* (2006.01)
*G11B 5/02* (2006.01)

(52) U.S. Cl.
CPC ............ *G11B 20/10018* (2013.01); *G11B 5/02* (2013.01)

(58) Field of Classification Search
None
See application file for complete search history.

(56) References Cited

U.S. PATENT DOCUMENTS

| 5,828,762 | A * | 10/1998 | Lee et al. ................. 381/94.8 |
| 6,826,003 | B1 | 11/2004 | Subrahmanyam |
| 7,154,687 | B2 | 12/2006 | Ikekame et al. |
| 7,830,631 | B2 | 11/2010 | Nakagawa et al. |
| 2014/0126077 | A1 * | 5/2014 | Contreras et al. ............... 360/46 |

* cited by examiner

*Primary Examiner* — Daniell L Negron
(74) *Attorney, Agent, or Firm* — HolzerIPLaw, PC

(57) ABSTRACT

The implementations disclosed herein provide for a storage device including a preamplifier that dynamically adjusts at least one of a rise time and fall time of an analog write current pulse based on a length of a corresponding write transition and/or characteristics of a media location where the write transition is to be recorded.

20 Claims, 9 Drawing Sheets

PREAMPLIFIER FOR ADJUSTABLE WRITE CURRENT

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

Implementations described and claimed herein provide a preamplifier that adjusts at least one of a rise time and a fall time of an analog write current pulse based on a length of a corresponding write transition.

BRIEF DESCRIPTIONS OF THE DRAWINGS

DETAILED DESCRIPTION

In magnetic recording, data is written to and read from individual bits along a series of circular or nearly circular data tracks on a media (e.g., a magnetic disc) using a transducer head aligned with the data tracks.

A transducer head typically has at least one write element (the "writer") and at least one read element (the "reader"). To write data to an individual data bit, the writer emits a magnetic field pulse sufficient to magnetize (i.e., "flip") the bit and orient it in a given direction. The timing and strength of these magnetic pulses is controlled by an analog current signal (the "write current"), which includes a series of pulses timed to arrive at the writer at the moment when the transducer head travels over a bit location on the media.

Small, single bit transitions (e.g., "010") are usually the hardest to record, while multi-bit length transitions (e.g., "0011100") record easily and can inadvertently erase adjacent track data. Certain adjustments can be made to the write current waveform to increase the writeability of smaller transitions; however, those adjustments, if uniformly applied to all transitions, tend to increase the inadvertent erasing or affecting of data adjacent to or near the writer.

The technology disclosed herein provides for transition-specific write current adjustments that increase the writeability of isolated transitions without a causing a corresponding increase in adjacent track interference (ATI) and side track erasure (STE).

Figure 1:
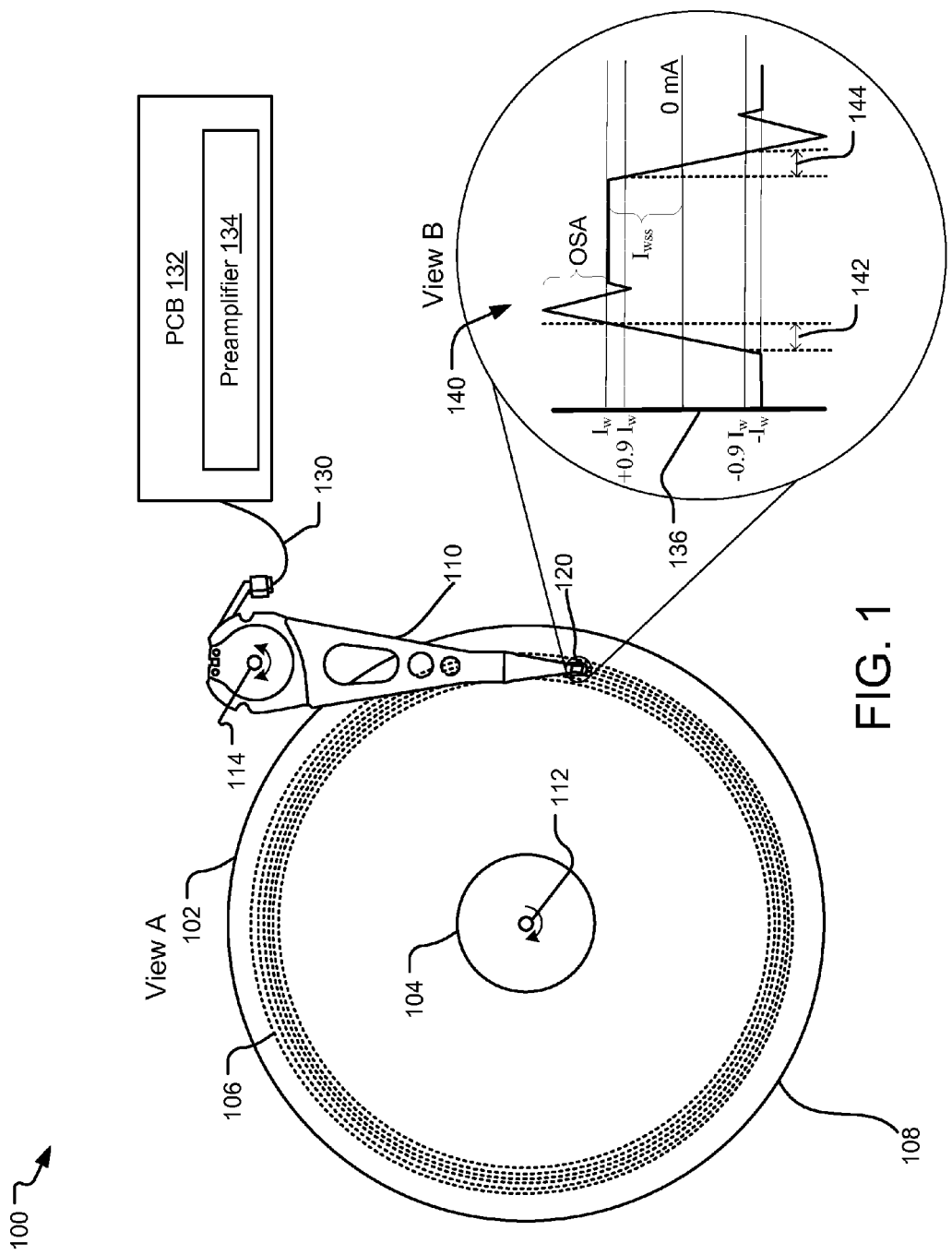
FIG. 1 illustrates an example disc drive assembly including preamplifier circuitry for providing transition-specific write current adjustments.

FIG. 1 illustrates an example disc drive assembly 100 including preamplifier circuitry 134 for providing transition-specific write current adjustments. The disc drive assembly 100 includes a transducer head 120 on a distal end of an actuator arm 110 positioned over a magnetic media 108. A rotary voice coil motor that rotates about an actuator axis of rotation 114 is typically used to position the transducer head on a data track and a spindle motor that rotates about disc axis of rotation 112 is used to rotate the media 108. The media 108 includes an outer diameter 102 and an inner diameter 104 between which are a number of data tracks 106, illustrated by circular dotted lines. In one implementation, the media 108 rotates at a constant high speed about a disc axis of rotation 112 as information is written to and read from the data tracks 106 on the media 108.

Information can be written to and read from the bits on the media 108 through the use of the actuator arm 110. The actuator arm 110 rotates about an actuator axis of rotation 114 during a seek operation to locate a desired data track on the media 108. The actuator arm 110 extends toward the media 108 such that the transducer head 120 flies in close proximity above the media 108 while reading and writing data to the media 108.

A flex cable 130 provides the requisite electrical connection paths for the transducer head 120 while allowing pivotal movement of the actuator arm 110 during operation. The flex cable 130 connects a printed circuit board (PCB) 132 of the transducer head 120. The PCB 132 includes a preamplifier 134 for controlling the write current applied to the transducer head 120 during a write operation. In particular, the preamplifier 134 applies a desired electrical current through one or more write coils connected to the writer. The write coils within the writer function to transform the electrical current into a magnetic field and direct the resulting magnetic flux density through a write pole to write data to the media 108.

View B depicts an example write pulse 140 transmitted to the transducer head 120 from the preamplifier 134. The current strength of the write pulse 140 (e.g., mA) is depicted on the vertical axis 136, while time is depicted in the horizontal (orthogonal) direction. In some applications including the implementation shown, the write pulse 140 is formed by combining an overshoot current and a square waveform. The overshoot current is added to the square waveform to compensate for the imperfections of real-world electronics (e.g., the inability of electronics to create a perfectly square waveform).

In View B, the amplitude of the square waveform portion of the write pulse 140 is denoted by $I_{wss}$, while the overshoot portion of the write pulse 140 has a maximum amplitude that exceeds the $I_{wss}$ by an overshoot amplitude (OSA), as shown. The write pulse 140 has a rise time 142 defined as the time interval required for the write pulse 140 to rise from $-0.9*(I_{wss})$ to $0.9*(I_{wss})$. Similarly, a fall time 144 is defined as the time interval required for the write pulse 140 to fall from $+0.9*(I_{wss})$ to $-0.9*(I_{wss})$.

In some implementations, write pulses corresponding to isolated, single-bit transitions are too weak to flip corresponding bits on the media 108. This results in transitions that are not fully recorded or missing. Consequently, the on-track bit error rate (BER) is dominated by these single-bit transitions. However, the preamplifier 134 can improve this BER by selectively shaping analog write pulses corresponding to isolated, single-bit transitions. The waveform adjustment systems and methods disclosed herein can also be used to shape write pulses corresponding to transitions of other lengths (e.g., transitions other than single-bit transitions).

According to one implementation of the disclosed technology, the preamplifier 134 adjusts one or more write current settings based on the length of an associated transition. Example write current settings include without limitation overshoot current, pulse duration, pulse rise time, pulse fall time, steady state current, pulse asymmetry, and pulse delay.

Figure 2:
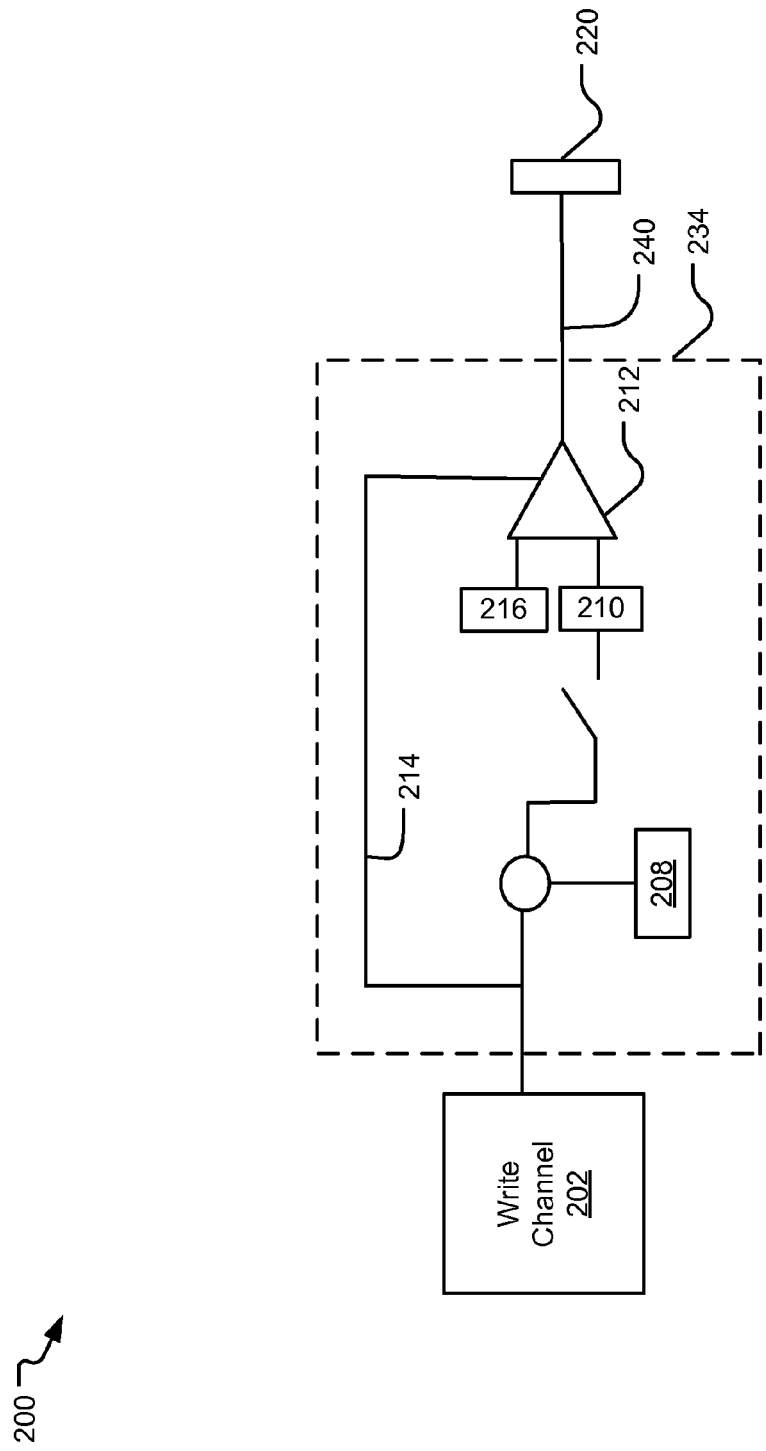
FIG. 2 illustrates example circuitry for providing transition-specific write current adjustments via a preamplifier in a magnetic storage device.

FIG. 2 illustrates example circuitry 200 for providing transition-specific write current adjustments via a preamplifier 234 in a magnetic storage device. Digital encoded data leaves a write channel 202 of the storage device and is input into the preamplifier 234. Within the preamplifier 234, the digital data travels along a line 214 to a driver 212. The driver 212 converts the write data to an analog signal (i.e., the write current) according to a number of write current settings and sends the write current along a line 240 to a writer 220 on a transducer head to record the digital data on a magnetic media.

The digital data also travels to a timer-based comparator 208, which is a programmable register that compares a time between a rising and falling edge of each digital write pulse with a programmed time value (e.g., a timing delta). When the timer-based comparator 208 observes the rising edge of a digital write pulse, the timer-based comparator 208 starts a timer. If the timer expires before the timer-based comparator 108 observes an end of the digital write pulse (e.g., the passing of a falling edge of the pulse), the transition is treated as a first, longer-type of transition. For example, a transition with the digital bit pattern '01110' may be long enough that the timer expires before the falling edge of the digital pulse is observed. In this case, the driver 212 generates the analog write current 240 using a set of default write current settings. The default write current settings are stored in a first preamp register (i.e., a default register 216).

If the timer of the timer-based comparator 208 does not expire before observing the end of the passing digital write pulse, then the transition is treated as a second, shorter-type of transition for which one or more write current settings are conditionally modified. If, for example, the timer-based comparator 208 observes the falling edge of a short pulse (e.g., an isolated, single-bit transition) before or simultaneously with expiration of the timer, the driver 212 creates a corresponding analog pulse based on one or more adjusted write current settings that differ from corresponding default write current settings.

The driver 212 can conditionally adjust a default write current setting by using a value stored or programmed in another preamp register (i.e., a conditional register 210). In one implementation, the value stored in the conditional register 210 is an absolute value that is added to a default write current setting to yield an adjusted write current setting. In another implementation, the value stored in the conditional register 210 is a scalar value that is multiplied by a write current setting to yield an adjusted write current setting. In yet another implementation, the driver 212 conditionally adjusts one or more default write current settings by a scalar multiplier received as an analog input voltage.

The driver 212 generates an analog write current pulse using one or more values stored in the conditional register 210 in addition to any default write current settings stored in the default register 216 that are not modified by the driver 212.

In one implementation, the driver 212 uses the default write current settings stored in the default register 216 to write all transitions except for single-bit transitions. The single-bit transitions are written using one or more conditionally-modified write current settings stored in the conditional register 210. For example, the driver 212 may increase a steady state current value, decrease a rise or fall time, increase an overshoot, adjust pulse asymmetry and/or additional write current parameters to generate an optimized transition pulse for a single bit transition.

Figure 3:
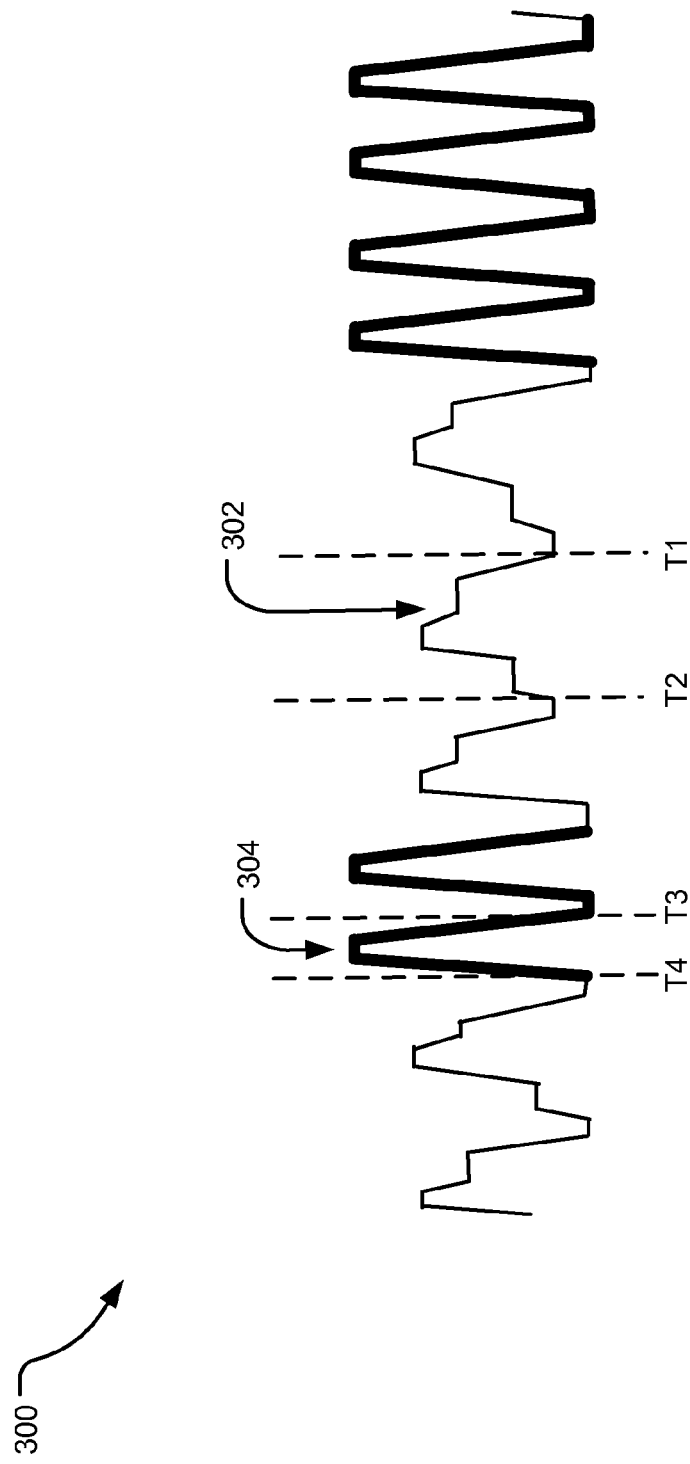
FIG. 3 illustrates an analog train of write current pulses produced by transition-specific write circuitry.

FIG. 3 illustrates an analog train of write current pulses 300 produced by transition-specific circuitry. Some pulses in the analog train are shaped differently than other pulses, depending on the length of a corresponding write transition. A preamplifier (not shown) generates each pulse in the analog train of write current pulses 300 responsive to receipt of a corresponding digital pulse from a write current channel. To produce the analog train of write current pulses 300, preamplifier circuitry may include a timer-based comparator (such as the timing-based comparator 208 in FIG. 2) that compares a time between rising and falling edges of a digital pulse to a programmed time value. The programmed time value can be any value useful in differentiating pulses of different lengths and can be used to tune single bit transitions at any data rate.

If the observed time between rising and falling edges of a digital pulse exceeds the programmed time value, the analog pulse output is created using default write current settings. For example, an analog write pulse 302 is a longer pulse corresponding to a multi-bit transition (e.g., '01110'). In detecting a digital pulse corresponding to the analog write pulse 302, a time interval (e.g., a time between T1 and T2) between the passing of a rising pulse edge and a falling pulse edge exceeded a programmed time value in a timer-based comparator. Thus, the analog write pulse 302 is generated using default write current settings.

When the time between rising and falling edges of a received digital pulse is less than or equal to the programmed time value, an analog pulse is created using one or more conditionally-modified write current settings. For example, the analog write pulse 304 is a shorter pulse corresponding to a single-bit transition (e.g., 010). Here, the time between detection of a rising edge (T3) and detection of a falling edge (T4) of the corresponding digital pulse is less than or equal to the time value programmed in the timer-based comparator. Therefore, the analog write pulse 304 is (along with other pulses indicated by bolded pulse lines) generated using one or more conditionally-applied write current settings that differ from the corresponding default values. For example, the conditionally-applied write current setting utilized to create the write pulse 304 may be a decreased rise or fall time, a larger overshoot current, and/or a greater steady state current than the corresponding values used to generate the write pulse 302. In the same or another implementations, the write pulse 304 has a pulse duration, delay, or asymmetry that differs from another pulse corresponding to a longer transition (e.g., the pulse 302).

The transition-specific adjustments in the analog pulse train 300 increase the writeability (e.g., BER) of short transitions. However, this increased writeability of short transitions is achieved without a corresponding increase in adjacent track interference (ATI) and side track erasure (STE) because the write current settings are adjusted based on the length of the transition and not adjusted uniformly for all transitions.

Figure 4:
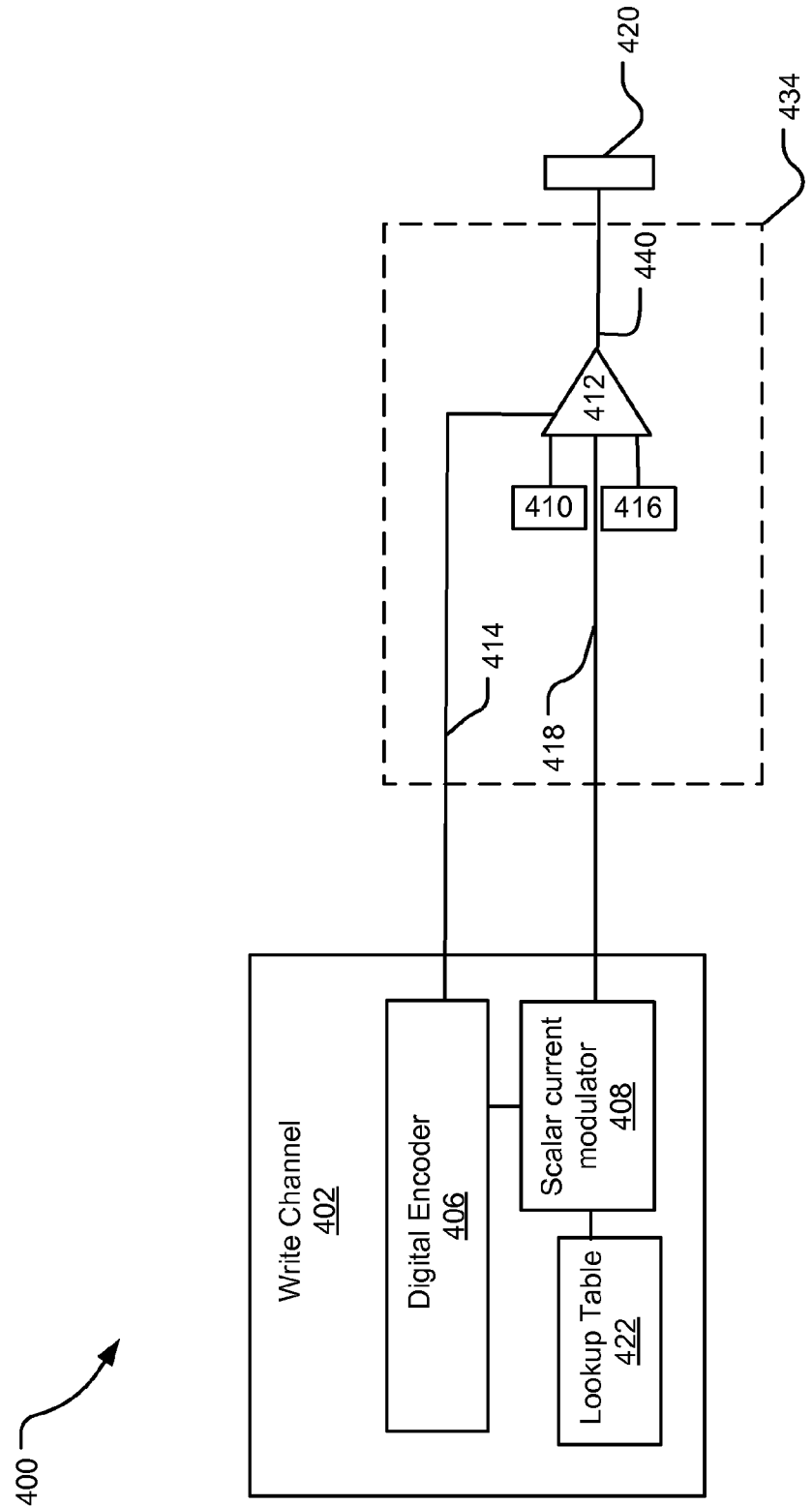
FIG. 4 illustrates example circuitry for providing transition-specific write current adjustments via a preamplifier of a magnetic storage device.

FIG. 4 illustrates example circuitry 400 for providing transition-specific write current adjustments via a preamplifier 434 of a magnetic storage device. A digital encoder 406 of a write channel 402 outputs digital, encoded write data to the preamplifier 434. Within the preamplifier 434, the digital data travels along a line 414 to a driver 412. The driver 412 converts the write data to an analog signal (i.e., the write current) based on a number of write current settings and sends the write current along a line 440 to a writer 420 on a transducer head to record the digital data on a magnetic media.

In generating the analog signal, the driver 412 selectively adjusts outgoing write pulses according to a modulating voltage simultaneously received along a line 418 from a scalar current modulator 408. The scalar current modulator 408 continuously modulates the voltage on the line 418 based on a prior analysis of the incoming digital write data and/or characteristics of target storage locations on the magnetic media.

In one implementation, the scalar current modulator 408 outputs a high-bandwidth modulating signal programmed with bit-level modifications of the digital write current. When the write data is within the write channel 402, the scalar current modulator 408 detects patterns in write data and accesses one or more tables (e.g., a lookup table 422) to select a voltage associated with each identified bit pattern. For example, the scalar current modulator 408 may detect a single-bit transition in the digital write data and retrieve, from the look-up table 422, a voltage associated with the pattern '010'. The retrieved voltage (i.e., a scaling voltage) is sent via the channel 402 or a buffer manager (not shown) over a transmission line 418 on a flex cable to the preamplifier 434. The preamplifier 434 provides the scaling voltage to a digital-to-analog converter (DAC) (not shown) or other circuitry of the driver 412. The driver 412 then uses the scaling voltage to proportionally scale one or more write current settings for transition-specific write current adjustments.

The look-up table 422 may be stored in any non-volatile memory accessible by the scalar current modulator 408, including non-volatile solid state memory (e.g., flash memory, read-only memories (RAMs), ferroelectric RAM (F-RAM), optical storage disk(s), etc.). In at least one implementation, the look-up table 422 is stored on a magnetic media of the storage device. In one implementation, the scaling voltage is a digital voltage sent to the preamplifier 434. The preamplifier 434 compares the digital voltage to a stored threshold value. When the digital voltage detected along the line 418 is below the stored threshold voltage, the driver 412 generates corresponding write current according to default write current settings stored in a default register 416. When a voltage along the line 418 exceeds the stored threshold voltage, the driver 412 alters one or more of the default write current settings using values stored in a conditional register 410. For example, the write driver 412 may scale a default write current setting in proportion to a ratio stored in the conditional register 410. Alternatively, the write driver 412 may change a default write current setting to an absolute value stored in the conditional register 410.

In another implementation, the scalar current modulator 408 outputs a low-frequency modulating analog signal programmed with sector-level or other media region-level modifications of the write current. This allows for selective write current adjustments to be made when writing to areas of the media where recording is especially problematic. For example, the driver 412 may scale one or more write current settings based on characteristics of the magnetic media (i.e., media characteristics) at target storage locations where associated transitions are to be recorded. Example media characteristics include without limitation channel bit density (CBD), asperities, and coercivity changes on the storage medium.

The lookup-table 422 may include information associating areas on the media such as a sector, track, bit, byte, wedge etc., with different scaling voltages. In response to receipt of a digital write pulse, the scalar current modulator 108 may retrieve a scaling voltage from the lookup table 422 that is optimal for use in association with a target storage location (e.g., a sector) of the media.

In another implementation, the scalar current modulator 408 outputs a high frequency modulating analog signal programmed with bit or byte level modifications of the write current. For example, the driver 412 may scale one or more write current settings according to media characteristics at the bit or the byte level (e.g., a surface asperity).

In still yet another implementation, the degree of scaling applied to a write current setting is based on both a length of an associated transition and one or more media characteristics of an associated target location. For example, a high channel bit density (CBD) in a region can create difficulty in recording certain binary patterns, such as single-bit transitions. Therefore, the lookup table 422 may include a number of scale factors that are each associated with a transition length and a target media location. For example, the preamplifier 434 may apply a particular scale factor to a write current setting when generating a write pulse to record a single-bit transition within a high CBD region on the media.

Figure 5:
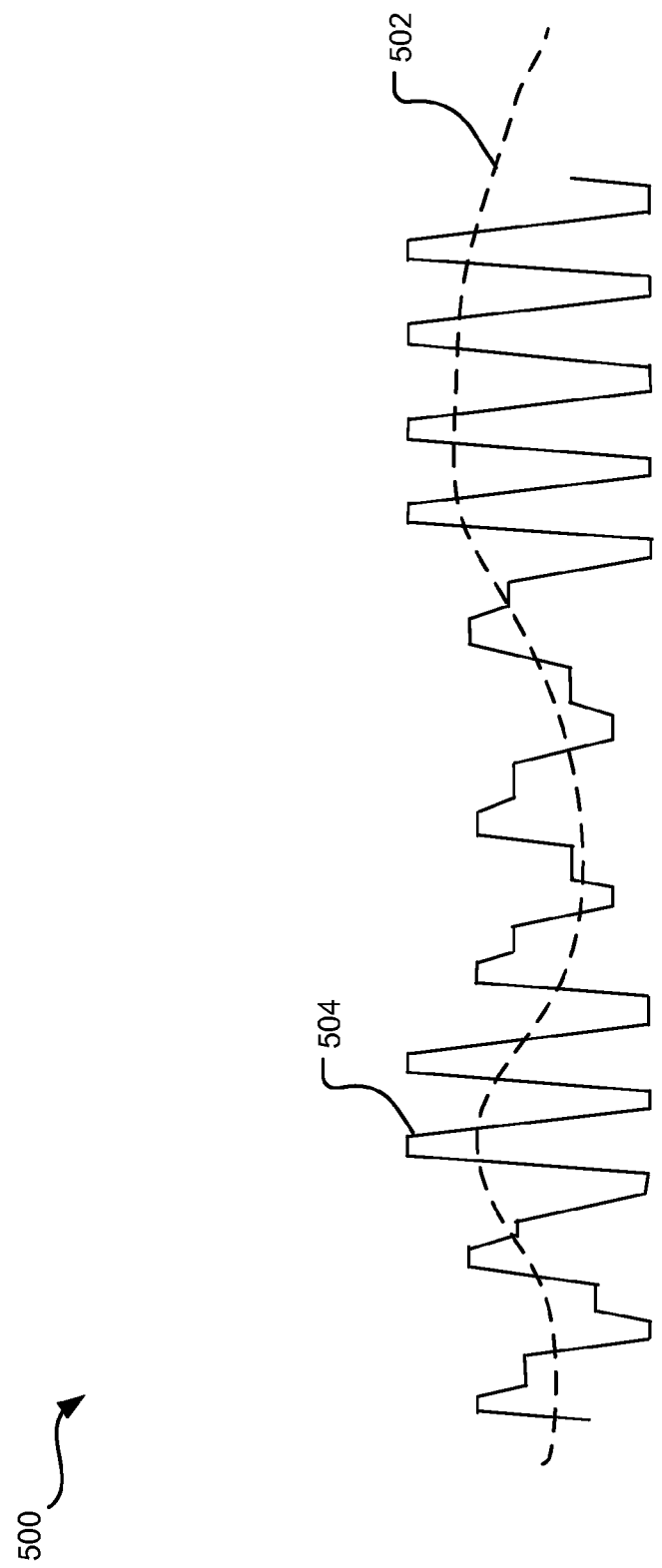
FIG. 5 illustrates another analog train of write current pulses produced by transition-specific write circuitry.

FIG. 5 illustrates an analog train of write current pulses 500 produced by transition-specific write circuitry. Some pulses of the analog train are shaped differently than other pulses, depending on the length of a corresponding write transition and/or upon media-specific characteristics of an associated storage location. A preamplifier (not shown) generates each pulse in the series of write current pulses 500 responsive to receipt of a corresponding digital pulse from a write channel. A scalar current modulator, such as the scalar current modulator described with respect to FIG. 4, provides a driver of the preamplifier with a continuous, modulating voltage 502 that is proportional to a scalar modification of the write current and/or a write current setting. The driver uses the modulating voltage to scale one or more write current settings such as pulse duration, rise time, fall time, steady state current, overshoot current, and pulse delay.

For example, the modulating voltage 502 increases in association with short (e.g., single-bit) transitions and decreases for longer transitions. The driver proportionally scales one or more write current settings along with these increases and decreases in the modulating voltage 502. For example, a driver may receive a digital pulse corresponding to the analog write pulse 504 at the same time that the modulating voltage increases. As a result, the driver generates the analog write pulse 504 based on an adjusted write current setting, such as an increased rise time. In other implementations, the modulating voltage 502 modulates based on media characteristics of a location on a magnetic media where each pulse is to be recorded.

Figure 6:
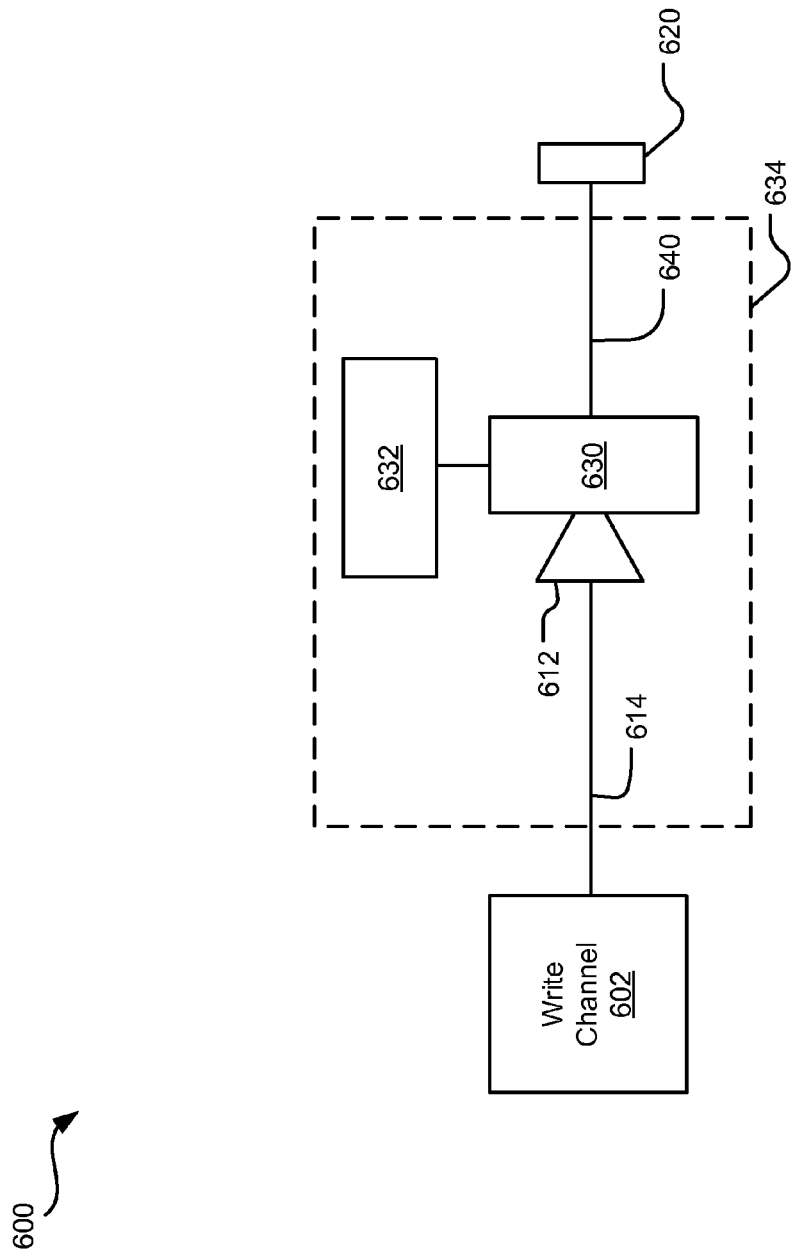
FIG. 6 illustrates example circuitry for providing transition-specific write current adjustments via a preamplifier of a magnetic storage device.

FIG. 6 illustrates another example of circuitry 600 for providing transition-specific write current adjustments via a preamplifier 634 of a magnetic storage device. A digital encoder of a write channel 602 outputs digital, encoded write data to the preamplifier 634 along a digital data line 614. Within the preamplifier 634, the digital data travels to a driver 612, which converts the write data to an analog signal (i.e., the write current) according to a number of write current settings. The analog waveform is then passed through a continuous time filter (CTF) 630 that applies a frequency-domain transfer function H(f) to the incoming data. The write data then travels along a line 640 to a writer 620 on a transducer head to record the digital data on a magnetic media.

One example of a CTF 630 is the approximate inverse of the transfer function of the overall effective write-current signal path. In practice, the CTF 630 could boost incoming signal power at high frequencies while mitigating any distortions due to signal reflections from signal-path impedance mismatches. Another example of a CTF 630 is a low-pass filter with a varying cut-off frequency used to change the outgoing write current rise time. Yet another example of a CTF 630 is a finite-impulse response (FIR) CTF. Other implementations are also contemplated.

In one implementation where a FIR CTF is used, the output of the CTF 630 is given by:

$$I_{scaled}(t) = \sum_{i=0}^{N} k_i(I[t-i]) \quad (1)$$

wherein $I_{scaled}(t)$ is the scaled write current output by the FIR 630; I(t) is the unscaled input write current as a function of time; and the value 'N' is a total number of filter taps (filter coefficients). The filter coefficients $k_i$ can be stored in one or more preamp registers (e.g., a preamp register 632). Unlike other implementations disclosed herein, the preamplifier 634 in FIG. 6 adjusts the entire output waveform rather than digitally assigning discrete write current settings for transitions of different lengths.

In one example implementation, the set of scale factors $K_i$ cause the CTF 630 to filter according to a function of the write current frequency. Thus, the CTF 630 can be used to boost the amplitude (e.g., peak current) of the write current I(t) for high frequency transitions, such as single-bit transitions, while leaving lower frequency transitions less affected. Portions of the waveform with higher frequency pulses are thus boosted more than portions of the waveform with lower frequency pulses. Consequently, higher frequency pulses in the outgoing waveform sent to the writer 620 on a transducer head may have a smaller (e.g., faster) rise or fall time than lower frequency pulses. In this manner, adjacent track interference and side track erasure may be mitigated or eliminated.

In another implementation, the CTF 630 is used to boost the amplitude of the write current I(t) for multi-bit transitions having a frequency corresponding to a narrow, pre-defined bandwidth.

In still yet another implementation, the continuous time filter 630 compensates for linear distortions present in the write current path, such as parasitic capacitance/inductor or impedance mismatches. For example, an engineer may characterize linear distortions by testing the system in a lab to identify a particular type of CTF that best compensates (e.g. effectively removes the impact of) for distortions on the waveform output from the CTF 630.

In another implementation, firmware of the storage device updates the scaling factors applied by the CTF 630. For example, a firmware update initiated by a host may change the scaling factor applied to increase the peak current of short or single-bit transitions.

Figure 7:
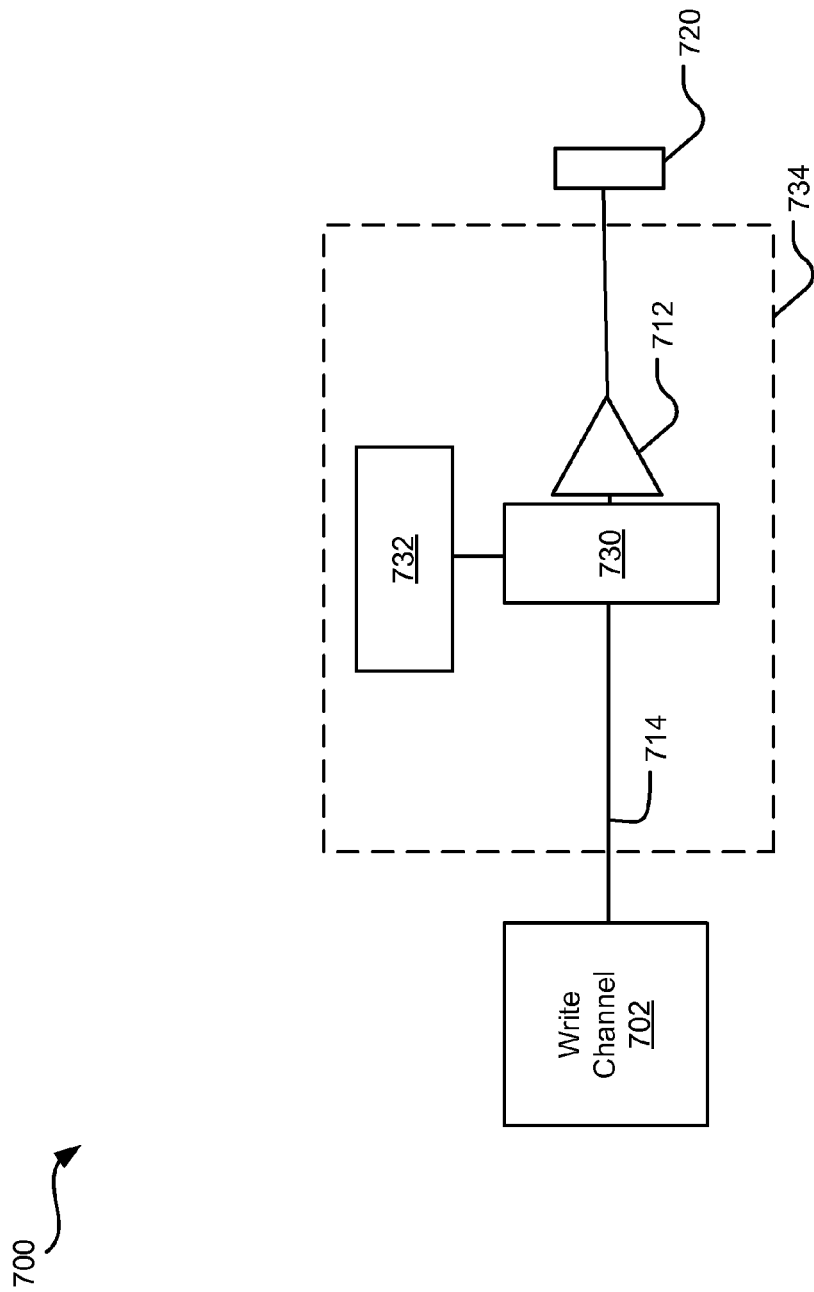
FIG. 7 illustrates example circuitry for providing transition-specific write current adjustments via a preamplifier of a magnetic storage device.

FIG. 7 illustrates another example of circuitry 700 for providing transition-specific write current adjustments via a preamplifier 734 of a magnetic storage device. A write channel 702 outputs digital, encoded write data to the preamplifier 734 along a digital data line 714. The digital data is input to a digital (discrete-time) FIR filter 730 that filters the waveform according to filter coefficients $K_j$ stored in a register 732. The FIR filter 730 feeds a driver 712 that includes a digital to analog converter (not shown), and the driver 712 converts the write data to an analog signal (i.e., the write current) according to a number of write current settings. The converted signal is then sent to a writer 720 on a transducer head to record the data on a magnetic media.

In FIG. 7, the digital data on the line 714 corresponds to an intended data rate for recording to the disk, while the voltage levels transmitted along the line 714 are intended to represent each of two (binary) states: {0,1}. Because the output of the FIR filter 730 may have finer resolution, such as 6 bits or more, the preamplifier 734 may also include digital circuitry (not shown) at the input of the FIR filter 730 that converts the {0,1} digital binary input to voltage levels compatible with expected resolution of the FIR filter 730. In such case, the discrete-time FIR filter 730 operates on the digital data assuming a sample-rate equal to the recording data rate.

In another implementation, the FIR filter 730 operates on an oversampled version of the digital data. For example, the outgoing write current waveform may be shaped at time intervals shorter than the recording bit length (e.g., 1/data rate). In such case, an A/D converter may be included at the input of the FIR filter 730, where the "analog" input is the digital data from the write channel 702. This A/D converter may sample at a rate higher than the recording data rate and have a digital output compatible with the FIR filter 730. In another implementation, the incoming digital data is converted with a digital circuit at the input of the FIR filter 730, as discussed above, while also being oversampled. After the scaled waveform $I_{scaled}(t)$ is formed via the FIR filter 730 (e.g., such as using equation (1) above in the sampled domain), the digital to analog converter in the driver 712 converts the sampled write current waveform to an analog signal.

In one implementation, the FIR filter 730 applies a current boost that is proportional to the frequency of each pulse.

By varying the filter coefficients, the FIR filter 730 may also be adapted to minimize the mean-square error of data read back from the magnetic medium. In one implementation, another FIR filter (not shown) is included within the read channel. Filter coefficients of the FIR filter in the read channel are continuously and systematically varied to minimize the mean-square error of equalized readback samples relative to an ideal readback signal. This process acts as an "outer loop optimization," and is augmented by another "inner loop optimization" that provides for systematic variation of the filter coefficients of the FIR filter 730 on the write side of the storage device.

The above-described "systematic variation" of filter coefficients may be achieved through various optimization methods like "steepest descent," that can be used to find the lowest mean-square error as a function of the FIR filter coefficients. Example "steepest descent" methodology is explained below.

A FIR filter consists of L weights w[l], which are applied to an incoming sampled data signal x[n]. The output of the FIR y[n] is a linear combination of readback signal x weighted by w:

$$y[n] = \sum_{l=1}^{L} w[l]x[n-l]. \quad (2)$$

The desired read signal is given by d[n], and the error between the desired signal and filtered signal is e[n]=d[n]−y[n]. The steepest descent method adaptation method adjusts the filter coefficient values w in the direction that minimizes the error magnitude. In terms of the gradient, this is given in the following expression:

$$w[l]|_{new} = w[l]|_{old} - \mu \frac{\partial(e^2)}{\partial(w[l])}. \quad (3)$$

The steepest descent adaptation algorithm (commonly called "LMS adaptation") is a simplification of the above expression by considering the linearity of the filtering operation (defined in eq. 2). One advantage of the LMS algorithm is that the expression for updating the FIR tap weights w[1] is a simple function of the error signal e[1] and the incoming data samples x:

$$w[l]l_{new} = w[l]l_{old} - \mu e[n] * x[n-l]. \quad (4)$$

The FIR filter for processing the readback signal can utilize LMS method (defined in eq. 4) because of the simple linear relationship between the error signal 'e' and the various FIR tap weights w. In contrast, the FIR filter 730 used for write-current shaping does not have a simple relationship to the error signal. As a result, the steepest descent method given by equation 3 may entail estimates of the error gradient with respect to the write-current FIR tap weights, based on measurements. Alternative methods may use more sophisticated optimization methods such as conjugate gradient, quasi-Newton methods, or response-surface DOE methods.

Figure 8:
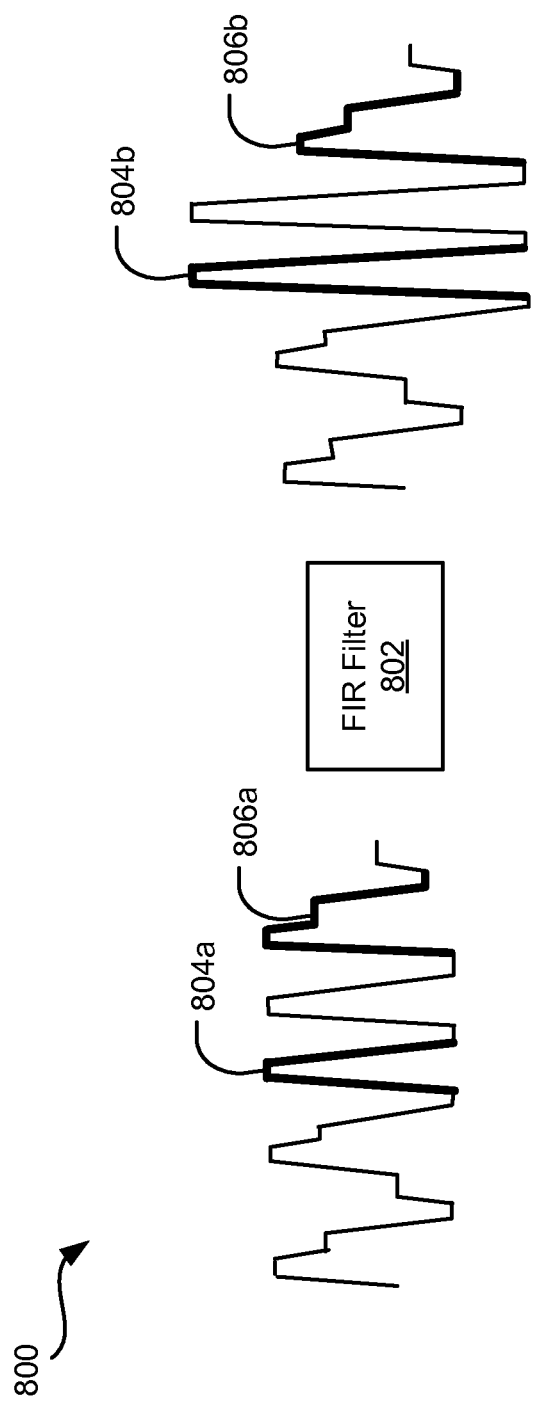
FIG. 8 illustrates an analog train of write current pulses input to and output from a FIR equalization filter.

FIG. 8 illustrates an analog train of write current pulses 800 input to and output from a FIR equalization filter 802. The train of write current pulses 800 input to the FIR equalization filter 802 is generated by a preamplifier responsive to receipt of a corresponding digital pulse from a write current channel. The FIR equalization filter 802 alters the waveform of the input analog write current pulses to equalize the writeability of pulses of various lengths. In FIG. 8, the FIR equalization filter 802 applies a current boost that is proportional to the frequency of each pulse. Thus, the FIR equalization filter 802 boosts the max current of the incoming pulses 804a and 806a to create the corresponding outgoing pulses 804b and 806b. Because the pulse 804a has a smaller frequency than the pulse 806a, the pulse 806a is boosted by a greater amount than the pulse 806a.

Figure 9:
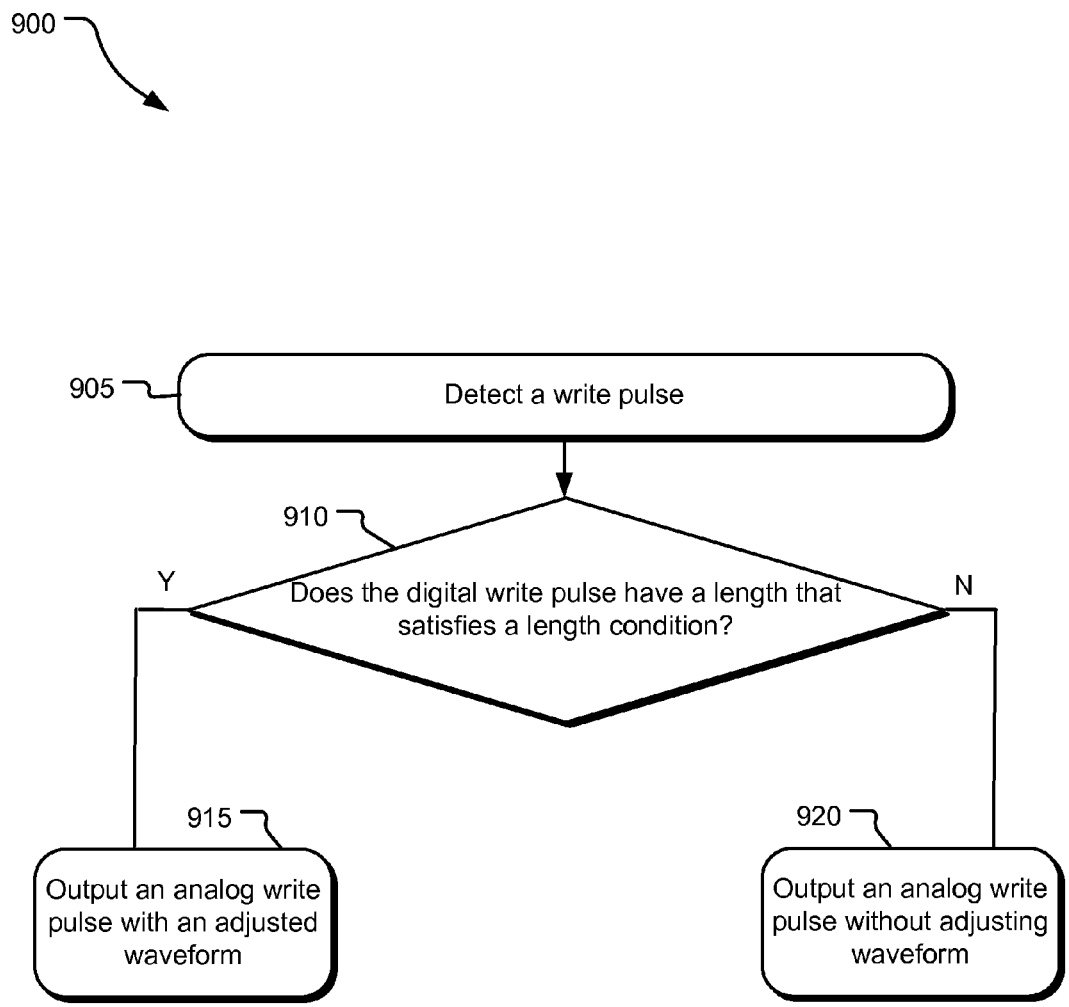
FIG. 9 illustrates example operations for providing transition-specific write current adjustments.

FIG. 9 illustrates example operations 900 for providing transition-specific write current adjustments. A detection operation 905 detects a write pulse and a determination operation 910 determines whether the write pulse has a length that satisfies a given length condition. If the length condition is not satisfied, a first generation and output operation 920 generates and outputs a corresponding analog write pulse without adjusting write current settings or otherwise altering the waveform of the output analog write pulse. If, however, the length condition is satisfied, a second generation and output operation 915 generates and outputs a corresponding analog write pulse with an adjusted waveform. In this case, the outgoing waveform is based on one or more conditionally-altered write current settings and/or conditionally shaped by an additional mechanism.

In one implementation, the detection operation 905 and the determination operation 910 are performed by a preamplifier of a storage device. The preamplifier includes a timer-based comparator that determines whether a time between passing of rising and falling edges of a digital write pulse exceeds a predetermined time value. If the time between passing of the rising and falling edges does not exceed the programmed time value, then the generation and output operation 920 outputs a corresponding analog pulse based on default write current settings. If, however, the time between passing of the rising and falling edges does exceed the programmed time value, then the generation and output operation 915 generates and outputs a corresponding analog pulse based one or more adjusted write current settings.

In another implementation, the detection operation 905 and the determination operation 910 are performed by a scalar current modulator in a write channel of the storage device. The scalar current modulator determines a length of an observed digital write pulse, and accesses a table to determine whether a length condition is satisfied.

If a length condition is satisfied, the scalar current modulator outputs a first voltage along a modulating voltage line that is received by a preamplifier simultaneously with the digital write pulse. Responsive to detecting the first voltage and the digital write current pulse, the generation and output operation 920 generates and outputs a corresponding analog write pulse according to a number of default write current settings. If, however, the length condition is not satisfied, the scalar current modulator outputs a second, different voltage along the modulating voltage line. Responsive to detection of the second voltage and the digital write current pulse, the output and generation operation 915 generates and outputs an analog pulse according to one or more conditionally-altered write current settings.

The above implementation allows a waveform adjustment to be based on more than one length condition. For example, the rise time of the outgoing waveform may be scaled to a number of different values in proportion to the voltage received along the modulating voltage line. In addition, the waveform adjustment may also be based on characteristics of a target location on a magnetic media where a corresponding transition is to be recorded. For example, the scalar current modulator may select a scaling voltage from a lookup table that is based on the length of an associated transition and/or a media characteristic of an associated target storage location. In this case, the scalar current modulator may output a voltage along the modulating voltage line that the preamplifier uses to adjust the output waveform in a particular way.

In still yet another implementation, the detection operation 905 and the determination operation 910 are performed by a continuous time or discrete-time finite impulse response (FIR) filter in a preamplifer of a storage device. The FIR filter detects the frequency (e.g., length) of an incoming write pulse and applies a boost that is a function of the frequency. The specific frequency-based function utilized may vary from one implementation to another. However, in one implementation a write pulse with a higher frequency (shorter pulse length) is boosted more than a write pulse of a lower frequency (longer pulse length). For a write pulse of lower frequency, the generation and output operation 920 outputs a write pulse that is based on default write settings and not adjusted by any other mechanism (e.g., boosted by the FIR filter). For a write pulse of higher frequency, the generation and output operation 915 outputs an adjusted analog write pulse. For example the adjusted write pulse may have a boosted peak current value.

The above specification, examples, and data provide a complete description of the structure and use of exemplary implementations of the technology. Since many implementations of the technology can be made without departing from the spirit and scope of the technology, the invention resides in the claims hereinafter appended. Furthermore, structural features of the different implementations may be combined in yet another implementation without departing from the recited claims.

What is claimed is:
1. An apparatus comprising:
a preamplifier configured to adjust at least one of a rise time and a fall time of an analog write current pulse based on a length of a corresponding write transition to generate an optimized transition pulse for a bit transition, the preamplifier comprising a finite impulse response (FIR) filter that alters a waveform of the analog write current pulse input into the FIR filter.

2. The apparatus of claim 1, wherein a write pulse associated with a single-bit write transition is adjusted to have a faster rise time than another write pulse associated with a multi-bit write transition.

3. The apparatus of claim 1, wherein the preamplifier increases at least one of a steady state current and an overshoot current based on the length of the write transition.

4. The apparatus of claim 1, wherein the FIR filter is configured to boost a peak current of the analog write current pulse based on frequency of the analog write current pulse.

5. The apparatus of claim 4, wherein a higher frequency analog write current pulse is boosted more than a lower frequency analog write current pulse.

6. The apparatus in claim 1, wherein the preamplifier is configured to adjust the rise time if rising and falling edges of a bit stream are detected within a timing delta stored in a programmable register.

7. The apparatus of claim 1, wherein the preamplifier is configured to adjust the rise time based on an external control signal from a write channel.

8. The apparatus of claim 7, wherein the external control signal is a voltage that modulates based on frequency of a corresponding transition.

9. The apparatus in claim 1, wherein the preamplifier is configured to adjust at least one of a pulse duration and pulse delay based on the length of the write transition.

10. A storage device comprising:
a preamplifier configured to adjust at least one of a rise time and a fall time of an analog write current pulse based on a length of a corresponding write transition and at least one media characteristic associated with a target storage location of a magnetic media to generate an optimized transition pulse for a single bit transition, the preamplifier configured to adjust the rise time based on an external control signal from a write channel.

11. The storage device of claim 10, wherein the preamplifier is configured to adjust the write current setting based on a modulating voltage received by the preamplifier.

12. The storage device of claim 10, wherein the preamplifier is configured to adjust least one of a pulse duration, a steady state current, an overshoot current, and pulse delay based on the length of the write transition.

13. A method comprising:
adjusting at least one of a rise time and a fall time of an analog write current pulse based on a length of a corresponding write transition to generate an optimized transition pulse for a bit transition; and
altering the analog write current pulse with a finite impulse response (FIR) filter based on the rise time and the fall time of the write transition.

14. The method of claim 13, wherein a write pulse associated with a single-bit write transition is adjusted to have a faster rise time than another write pulse associated with a multi-bit write transition.

15. The method of claim 13, further comprising:
adjusting at least one of a pulse duration a rise time a fall time an overshoot current pulse delay and a steady state current portion of the write current pulse based on the length of the write transition.

16. The method of claim 13, wherein the adjustment operation adjusts at least one write current setting based on a media-specific characteristic of a target storage location.

17. The method of claim 13, wherein the adjustment operation is performed if a voltage received by a preamplifier exceeds a stored threshold condition.

18. The method of claim 17, wherein the voltage received is sent to the preamplifier from a write channel.

19. The method of claim 13, wherein the FIR applies a boost to a peak current of the analog write current pulse and the boost is proportional to a frequency of the analog write current pulse.

20. The method of claim 13, wherein the adjustment operation is performed if rising and falling edges of a bit stream are detected within a timing delta stored in a programmable register.

* * * * *